(12) United States Patent
Shin et al.

(10) Patent No.: US 9,164,890 B2
(45) Date of Patent: Oct. 20, 2015

(54) STORAGE DEVICE CAPABLE OF INCREASING ITS LIFE CYCLE AND OPERATING METHOD THEREOF

(71) Applicants: Seung-Yong Shin, Seoul (KR); Young-Hyun Jun, Seoul (KR); Hee-Chang Cho, Seoul (KR)

(72) Inventors: Seung-Yong Shin, Seoul (KR); Young-Hyun Jun, Seoul (KR); Hee-Chang Cho, Seoul (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 285 days.

(21) Appl. No.: 13/792,696

(22) Filed: Mar. 11, 2013

(65) Prior Publication Data

US 2014/0006690 A1    Jan. 2, 2014

(30) Foreign Application Priority Data

Jun. 28, 2012  (KR) .................. 10-2012-0070079

(51) Int. Cl.
| | | |
|---|---|---|
| *G06F 12/00* | (2006.01) | |
| *G06F 12/02* | (2006.01) | |
| *G06F 3/06* | (2006.01) | |

(52) U.S. Cl.
CPC .......... *G06F 12/0246* (2013.01); *G06F 3/0616* (2013.01); *G06F 3/0638* (2013.01); *G06F 3/0679* (2013.01)

(58) Field of Classification Search
CPC . G06F 12/0246; G06F 3/0679; G06F 3/0638; G06F 3/0616
See application file for complete search history.

(56) References Cited

U.S. PATENT DOCUMENTS

| | | |
|---|---|---|
| 5,644,539 A | 7/1997 | Yamagami et al. |
| 5,742,934 A | 4/1998 | Shinohara |
| 7,487,300 B2 | 2/2009 | Kessels et al. |
| 7,596,656 B2 | 9/2009 | Elhamias |
| 2002/0083381 A1* | 6/2002 | Dover et al. .................. 714/718 |
| 2009/0024787 A1 | 1/2009 | Yim |
| 2009/0144512 A1 | 6/2009 | Yoshida |
| 2009/0323419 A1 | 12/2009 | Lee et al. |
| 2009/0327592 A1 | 12/2009 | Chang et al. |
| 2011/0194354 A1* | 8/2011 | Ueno ........................ 365/185.19 |
| 2013/0042053 A1* | 2/2013 | Huang .......................... 711/103 |
| 2014/0006691 A1* | 1/2014 | Haukness et al. ............. 711/103 |
| 2015/0046664 A1* | 2/2015 | Fitzpatrick et al. ........... 711/156 |

FOREIGN PATENT DOCUMENTS

| | | |
|---|---|---|
| JP | 2009-055457 A | 3/2009 |
| KR | 10 2009-0007926 A | 1/2009 |
| KR | 10-2009-0054343 A | 5/2009 |

* cited by examiner

*Primary Examiner* — John Lane
(74) *Attorney, Agent, or Firm* — Lee & Morse, P.C.

(57) ABSTRACT

Provided is a storage device capable of increasing its life cycle and operating method thereof. The storage device includes a nonvolatile memory device that stores data and a controller that controls the nonvolatile memory device. The controller receive can modify a write time-out value of the nonvolatile memory device in accordance with predetermined conditions, such as request from a host or exceeding of a predefined life cycle.

31 Claims, 7 Drawing Sheets

WR_TIME_MO_SP

| Bit 7 | Bit 6 | Bit 5 | Bit 4 | Bit 3 | Bit 2 | Bit 1 | Bit 0 |
|---|---|---|---|---|---|---|---|
| RESERVED | | | | | | | SUPPORTED |

FIG. 6

| CARD COMMAND CLASS | | 0 | ..... | 10 | ..... |
|---|---|---|---|---|---|
| SUPPORTED COMMANDS | CLASS DESCRIPTION | BASIC | | SWITCH | |
| ⋮ | ⋮ | | | ⋮ | |
| CMD 6 | MANDATORY | | | + | |
| ⋮ | ⋮ | | | ⋮ | |
| CMD 60 | OPTIONAL | | | + | |

FIG. 7

EXCEPTION_EVENTS_CTRL

| Bit 7 | Bit 6 | Bit 5 | Bit 4 | Bit 3 | Bit 2 | Bit 1 | Bit 0 |
|---|---|---|---|---|---|---|---|
| RESERVED | RESERVED | RESERVED | WR_TIME_MO_EN | PACKED_EVENT_EN | SYSPOOL_EVENT_EN | DYNCAP_EVENT_EN | RESERVED |

| Bit 15 | Bit 14 | Bit 13 | Bit 12 | Bit 11 | Bit 10 | Bit 9 | Bit 8 |
|---|---|---|---|---|---|---|---|
| RESERVED ||||||||

FIG. 8

RESPONSE

| Bit position | Bit 47 | Bit 46 | Bit [45:40] | Bit [39:8] | Bit 7 | Bit 0 |
|---|---|---|---|---|---|---|
| Description | Start bit | Transmission bit | Command index | Device status | CRC7 | End bit |

FIG. 9

EXCEPTION_EVENTS_STATUS

| Bit 7 | Bit 6 | Bit 5 | Bit 4 | Bit 3 | Bit 2 | Bit 1 | Bit 0 |
|---|---|---|---|---|---|---|---|
| RESERVED | RESERVED | RESERVED | WR_TIME_MO_NEEDED | PACKED_FAILURE | SYSPOOL_EXHAUSTED | DYNCAP_NEEDED | URGENT_BKOPS |

| Bit 15 | Bit 14 | Bit 13 | Bit 12 | Bit 11 | Bit 10 | Bit 9 | Bit 8 |
|---|---|---|---|---|---|---|---|
| RESERVED ||||||||

FIG. 10

| R2W_FACTOR | Multiples of read access time |
|---|---|
| 0 | 1 |
| 1 | 2 |
| 2 | 4 |
| 3 | 8 |
| 4 | 16 |
| 5 | 32 |
| 6 | 64 |
| 7 | 128 |

STORAGE DEVICE CAPABLE OF INCREASING ITS LIFE CYCLE AND OPERATING METHOD THEREOF

CROSS-REFERENCE TO RELATED APPLICATION

The present application claims priority under 35 U.S.C. §119 to Korean Patent Application No. 10-2012-0070079, filed on Jun. 28, 2012, in the Korean Intellectual Property Office, and entitled: "Storage Device Capable of Increasing Its Life Cycle and Operating Method Thereof," which is incorporated by reference herein in its entirety.

BACKGROUND

1. Field

Embodiments relate to a storage device and operating method thereof, and more particularly to a storage device capable of increasing its life cycle and operating method thereof.

2. Description of the Related Art

In recent years, storage devices are being used in various manners. For example, the storage device may be used as a memory card, such as an SD (Secure Digital) card, an MMC (Multi-Media Card), an xD (eXtreme Digital) card, a CF (Compact Flash) card, an SM (Smart Media) card, a memory stick, and so on. In addition, the storage device may also be used as a SSD (solid state drive).

A storage device has a time-out value that is a predefined value or a value that can be defined later. To write data, the storage device should execute a write operation within a range of a time-out value. In other words, if the write operation takes longer to execute than the time-out value, the write operation being executed may be treated as a failure or error.

SUMMARY

According to one or more embodiments, there is provided a storage device including a nonvolatile memory device that stores data, and a controller that controls the nonvolatile memory device, wherein the controller receives a request from a host for write time-out value modification and modifies a write time-out value of the nonvolatile memory device.

When the storage device is used in excess of a predefined life cycle, the controller may modify the write time-out value.

Before a request for the write time-out value modification is received from the host, the controller may notify the host of a need for the write time-out value modification.

Notifying the need for the write time-out value modification may include the controller transmitting a response signal to the host in accordance with a previous command, the response signal including first information indicating occurrence of exception event.

Before a request for the write time-out value modification is received from the host, the controller may transmit to the host exception event status data indicating which of a plurality of all possible exception events has occurred to the storage device.

The exception event status data may include second information indicating whether or not to modify the write time-out value.

The controller may store write time-out value modification support data indicating whether or not write time-out value modification is supported.

The controller may store exception event control data indicating whether or not to enable the write time-out value modification.

The controller may use a R2W factor to modify the write time-out value.

The controller may modify the write time-out value by correcting a busy timeout period.

According to one or more embodiments, there is provided a storage device including a nonvolatile memory device that stores data, and a controller that controls the nonvolatile memory device, wherein when the nonvolatile memory device is used in excess of a predefined life cycle, the controller modifies a write time-out value of the nonvolatile memory device.

The controller may notify the host of a need for write time-out value modification, receive a request for write time-out value modification from the host, and modify the write time-out value of the nonvolatile memory device.

The controller may transmit a response signal to the host in accordance with a previous command, the response signal including first information indicating occurrence of exception event.

According to one or more embodiments, there is provided a storage device including a host interface that receives a request for write time-out value modification from a host, and a processor that modifies the write time-out value of the nonvolatile memory device in accordance with the request for the write time-out value modification.

Before a request for the write time-out value modification is received from the host, the controller may notify the host of a need for the write time-out value modification.

The host interface may transmit a response signal to the host in accordance with a previous command, the response signal including first information indicating occurrence of exception event.

The storage device may include a storage unit that stores event status data indicating which of a plurality of all possible exception events has occurred to the storage device, wherein the exception event status data includes second information indicating whether or not to modify the write time-out value, wherein, before the request for the write time-out value modification is received from the host, the host interface receives a request for the exception event status data.

The storage device may include a storage unit that stores write time-out value modification support data indicating whether or not write time-out value modification is supported.

The storage device may include a storage unit that stores exception event control data indicating whether or not to enable the write time-out value modification.

According to one or more embodiments, there is provided a host device that controls a storage device including a nonvolatile memory device, the host device including a host processor that determines whether to modify a write time-out value of the nonvolatile memory device or not; and an interface module that is connected to the host processor and makes a request for the write time-out value modification according to the determination result.

The interface module may make a request for exception event status data indicating which of a plurality of all possible exception events has occurred to the storage device.

The interface module may make a request to the storage device to check with write time-out value modification support data indicating whether or not a write time-out value function is supported.

The interface module may make a request to the storage device for setting exception event control data indicating whether or not to enable the write time-out value modification.

According to one or more embodiments, there is provided an operating method of a storage device, including receiving a request for write time-out value modification from a host; modifying the write time-out value of the nonvolatile memory device in accordance with the request for the write time-out value modification; and providing a set response signal indicating that the write time-out value is modified.

Before requesting the write time-out value modification is received from the host, further comprising notifying the host of a need for the write time-out value modification.

According to one or more embodiments, there is provided a storage device including a nonvolatile memory device that stores data and a controller that controls the nonvolatile memory device, wherein the controller and modifies a write time-out value of the nonvolatile memory device and sends a notification to a host that a modification has occurred.

The controller may modify the write time-out value of the nonvolatile memory device by increasing an initially defined write time-out value of the nonvolatile memory device.

The controller may modify the write time-out value of the nonvolatile memory device by multiplying a read access time by a factor.

The controller may modify the write time-out value of the nonvolatile memory device by correcting a busy timeout period.

The controller may transmit to the host exception event status data indicating which of a plurality of all possible exception events has occurred to the storage device.

BRIEF DESCRIPTION OF THE DRAWINGS

Features will become apparent to those of ordinary skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The use of the terms "a" and "an" and "the" and similar referents in the context of describing embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

Unless defined otherwise, all technical and scientific terms used herein have the same meaning as commonly understood by one of ordinary skill in the art. It is noted that the use of any and all examples, or exemplary terms provided herein is intended merely to better illuminate embodiments and is not limiting unless otherwise specified. Further, unless defined otherwise, all terms defined in generally used dictionaries may not be overly interpreted.

Embodiments will be described with reference to perspective views, cross-sectional views, and/or plan views, in which preferred embodiments are shown. Thus, the profile of an exemplary view may be modified according to manufacturing techniques and/or allowances. That is, the embodiments are not intended to limit the scope, but cover all changes and modifications that can be caused due to a change in manufacturing process. Thus, regions shown in the drawings are illustrated in schematic form and the shapes of the regions are presented simply by way of illustration and not as a limitation.

Figure 1:
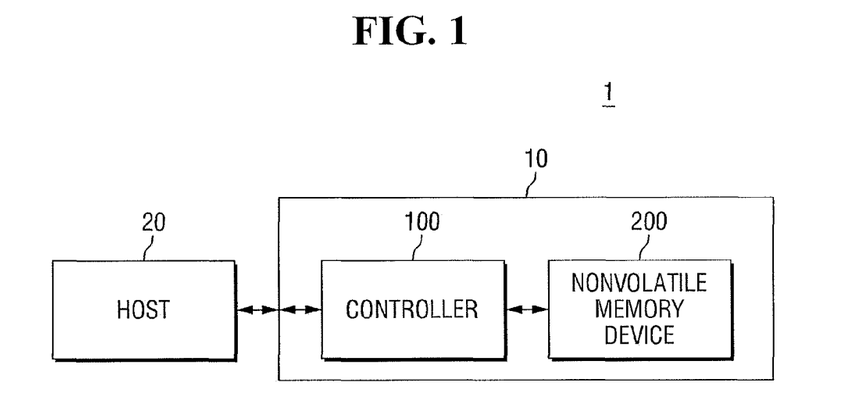
FIG. 1 illustrates a block diagram of a system according to an embodiment.
Figure 2:
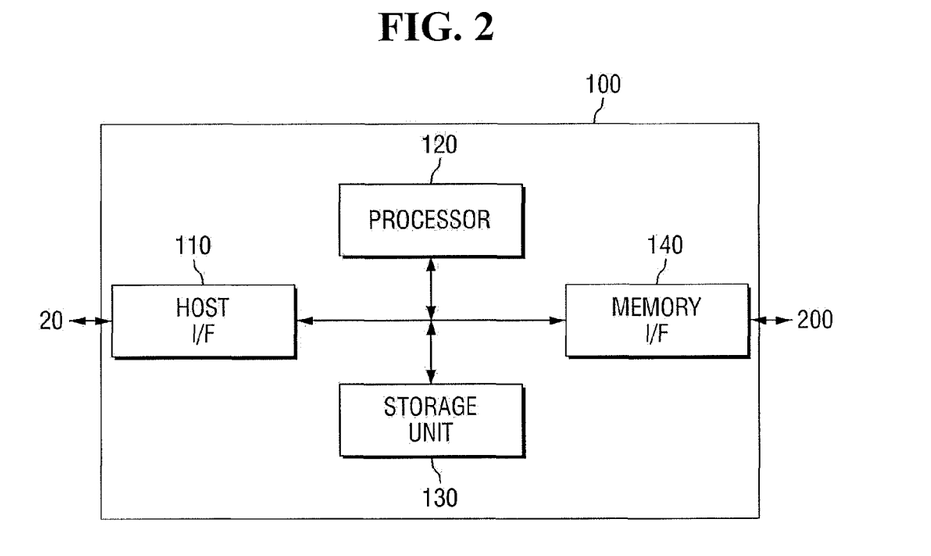
FIG. 2 illustrates a block diagram of an example of the controller shown in FIG. 1.
Figure 3:
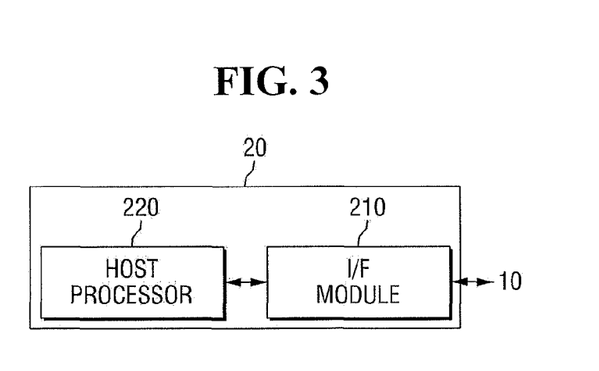
FIG. 3 illustrates a block diagram of an example of the host shown in FIG. 1.

FIG. 1 illustrates a block diagram of a system according to an embodiment. FIG. 2 illustrates a block diagram of an example of the controller shown in FIG. 1. FIG. 3 illustrates a block diagram of an example of the host shown in FIG. 1.

Referring to FIG. 1, a system 1 includes a storage device 10 and a host 20. The storage device 10 may include a nonvolatile memory device 200 that stores data and a controller 100 that controls the nonvolatile memory device 200.

The controller 100 is connected to the host 20 and the nonvolatile memory device 200. In response to a request from the host 20, the controller 100 is configured to access the nonvolatile memory device 200. For example, the controller 100 is configured to control the read, write, erase, or background operation of the nonvolatile memory device 200. The controller 100 is configured to provide interfacing between the nonvolatile memory device 200 and the host 20. The controller 100 is configured to drive firmware for controlling the nonvolatile memory device 200.

Referring to FIG. 2, in an exemplary embodiment, the controller 100 may include a processor 120, a host interface (I/F) 110, a storage unit 130, and a memory interface (I/F) 140.

The host I/F 110 may include a protocol for performing the exchange of data between a host 20 and the controller 100. In exemplary embodiments, the controller 100 may be configured to communicate with an external host using one or more data protocols, such as a universal serial bus (USB), multimedia card (MMC), peripheral component interconnect (PCI), peripheral component interconnect express (PCI-E), advanced technology attachment (ATA), serial-ATA, parallel-ATA, small computer system interface (SCSI), enhanced small disk interface (ESDI), integrated drive electronics (IDE), and so on.

The memory I/F 140 may typically implement a protocol for interacting with the nonvolatile memory device 200. For example, the memory I/F 140 may include an NAND interface or a NOR interface.

The storage unit 130 may be used as at least one of an operation memory of the processor 120, a cache memory between the nonvolatile memory device 200 and the host 20, and a buffer memory between the nonvolatile memory device 200 and the host 20. The storage unit 130 may store data such as write time-out value modification support data WR_TIME_MO_SP, exception event control data EXCEPTION_EVENTS_CTRL, exception event status data EXCEPTION_EVENTS_STATUS, and so on.

The processor 120 controls the overall operation of the controller 100. Although not shown, the controller 100 may further include an ECC block. The ECC block is configured to detect and correct errors of data read from nonvolatile memory device 200 using error correction code (ECC).

Referring to FIG. 3, in an exemplary embodiment, the host 20 may include an interface module 210 and a host processor 220. In addition, although not shown, the host 20 may further include RAM, ROM, and/or other elements.

The interface module 210 is used to communicate with the host I/F 110 of the storage device 10. The interface module 210 may include the above-described protocol.

The host processor 220 controls the overall operation of the host 20. The host processor 220 may determine whether to modify a write time-out value WR_TIME of the nonvolatile memory device 200, which will be described later. In addition, the host processor 220 may make a request for exception event status data EXCEPTION_EVENTS_STATUS indicating which of a plurality of all possible exception events has occurred to the storage device 10 through the interface module 210. In addition, the host processor 220 may make a request to the storage device 10 to check with write time-out value modification support data WR_TIME_MO_SP indicating whether write time-out value modification is supported or not through the interface module 210. The host processor 220 may make a request to the storage device 10 to set exception event control data EXCEPTION_EVENTS_CTRL indicating whether the write time-out value modification is to be enabled or not through the interface module 210.

Referring to FIGS. 1 to 3, in the system 1 according to some embodiments, the controller 100 may modify the write time-out value WR_TIME of the nonvolatile memory device 200. In particular, the controller 100 may receive a request for the write time-out value modification from the host 20 and may modify the write time-out value WR_TIME accordingly.

Here, the write time-out value WR_TIME may be a predefined value or a value that can be defined later. The write time-out value WR_TIME may be defined as, for example, 250 msec. The write time-out value WR_TIME may be defined by time or speed. To write data, the storage device 10 should execute a write operation write within a range of the time-out value WR_TIME. That is to say, if the write operation is executed in excess of the time-out value, the write operation being executed may be treated as a failure or an error.

The controller 100 may modify the write time-out value WR_TIME in various manners. For example, the controller 100 may directly increase, e.g., double, an initially defined write time-out value WR_TIME, e.g., may increase 250 msec to 500 msec. Alternatively, the controller 100 may modify the write time-out value WR_TIME by correcting R2W_FACTOR. The R2W_FACTOR is a value that indicates how many multiples a write time-out value WR_TIME is of a read access time. That is to say, the write time-out value WR_TIME may be increased by increasing the R2W_FACTOR. For example, R2W_FACTOR correction may be used in a case where the storage device 10 is an eMMC card or an SD card.

Alternatively, the controller 100 may modify the write time-out value WR_TIME by correcting a busy timeout period. The busy timeout period means a maximum busy time for correcting data written in the storage device 10. For example, busy timeout period correction may be used in a case where the storage device 10 is a UFS card.

The longer the storage device 10 is used, the more the time for writing data is needed. When the storage device 10 is used for a long time, the more frequently the write time may exceed the time-out value WR_TIME. Without changing the time out value WR_TIME, the storage device 10 can no longer effectively perform write operations.

In the system 1 according to some embodiments, when the storage device 10 is used in excess of a predefined life cycle, the controller 100 may modify the write time-out value WR_TIME. Therefore, if the write time-out value WR_TIME increases, the write operation may be performed within the increased range of the write time-out value WR_TIME. Therefore, the rate of write operations treated as failures or errors can be noticeably reduced. As the result, the life cycle of the storage device 10 can be extended by correcting the write time-out value WR_TIME.

As described above, in order to modify the write time-out value WR_TIME, the controller 100 may notify the host 20 of a need for the write time-out value modification in advance.

In addition, the controller 100 may notify the host 20 of occurrence of an exception event. The notified host 20 may make a request for details of the exception event. That is to say, the host 20 may make a request for exception event status data (EXCEPTION_EVENTS_STATUS of FIG. 9). The exception event status data EXCEPTION_EVENTS_STATUS may indicate which of a plurality of all possible exception events has occurred. That is to say, the exception event status data EXCEPTION_EVENTS_STATUS may include information indicating whether to modify the write time-out value WR_TIME or not.

When the storage device 10 and the host 20 are connected to each other, the host 20 may first check whether or not the storage device 10 supports write time-out value modification. The controller 100 may store write time-out value modification support data (WR_TIME_MO_SP of FIG. 5) indicating whether the write time-out value modification is supported or not.

If the storage device 10 supports the write time-out value modification, the host 20 may determine whether or not to enable the write time-out value modification. The controller 100 may store exception event control data (EXCEPTION_EVENTS_CTRL of FIG. 7) indicating whether to enable the write time-out value modification or not. The exception event status data EXCEPTION_EVENTS_STATUS may indicate which of a plurality of all possible exception events has been enabled. That is to say, the exception event control data EXCEPTION_EVENTS_CTRL may include information indicating whether to enable the write time-out value modification or not.

The method of modifying the write time-out value WR_TIME will later be described with reference to FIGS. 4 to 10.

Referring to FIG. 1, the controller 100 and the nonvolatile memory device 200 may be commonly integrated within a single integrated circuit device. In one embodiment, the controller 100 and the nonvolatile memory device 200 are integrated within a memory card. For instance, the controller 100 and the nonvolatile memory device 200 may be integrated into, a multimedia card (MMC, RS-MMC, MMCmicro), an SD card (SD, miniSD, microSD), a universal flash memory device (UFS), a personal computer memory card international association (PCMCIA), a compact flash card (CF), a smart media card (SM/SMC), a memory stick, and so on.

Alternatively, the controller 100 and the nonvolatile memory device 200 may be integrated to form a solid state drive/disk (SSD). The SSD includes a storage device configured to store data in a semiconductor memory.

The memory system 1 may include, but is not limited to, a computer, an ultra-mobile PC (UMPC), a workstation, a netbook, a personal digital assistant (PDA), a portable computer, a web tablet, a wireless phone, a mobile phone, a smart phone, an e-book, a portable multimedia player (PMP), a portable game device, a navigation device, a black box, a digital camera, a 3-dimensional television, a digital audio recorder/player, a digital picture/video recorder/player, a device capable of transmitting and receiving information via wireless communication, one of various electronic devices constituting a home network, one of various electronic devices constituting a computer network, one of various electronic devices constituting a telematics network, RFID, or one of various electronic devices constituting a computing system.

The nonvolatile memory device 200, the storage device 10 or the memory system 1 may be mounted into various packages, e.g., Package on Package (PoP), Ball grid arrays (BGAs), Chip scale packages (CSPs), Plastic Leaded Chip Carrier (PLCC), Plastic Dual In Line Package(PDIP), Die in Waffle Pack, Die in Wafer Form, Chip On Board (COB), Ceramic Dual In Line Package (CERDIP), Plastic Metric Quad Flat Pack (MQFP), Thin Quad Flatpack (TQFP), Small Outline (SOIC), Shrink Small Outline Package (SSOP), Thin Small Outline (TSOP), Thin Quad Flatpack (TQFP), System In Package (SIP), Multi Chip Package (MCP), Wafer-level Fabricated Package (WFP), Wafer-Level Processed Stack Package (WSP), etc.

Figure 4:
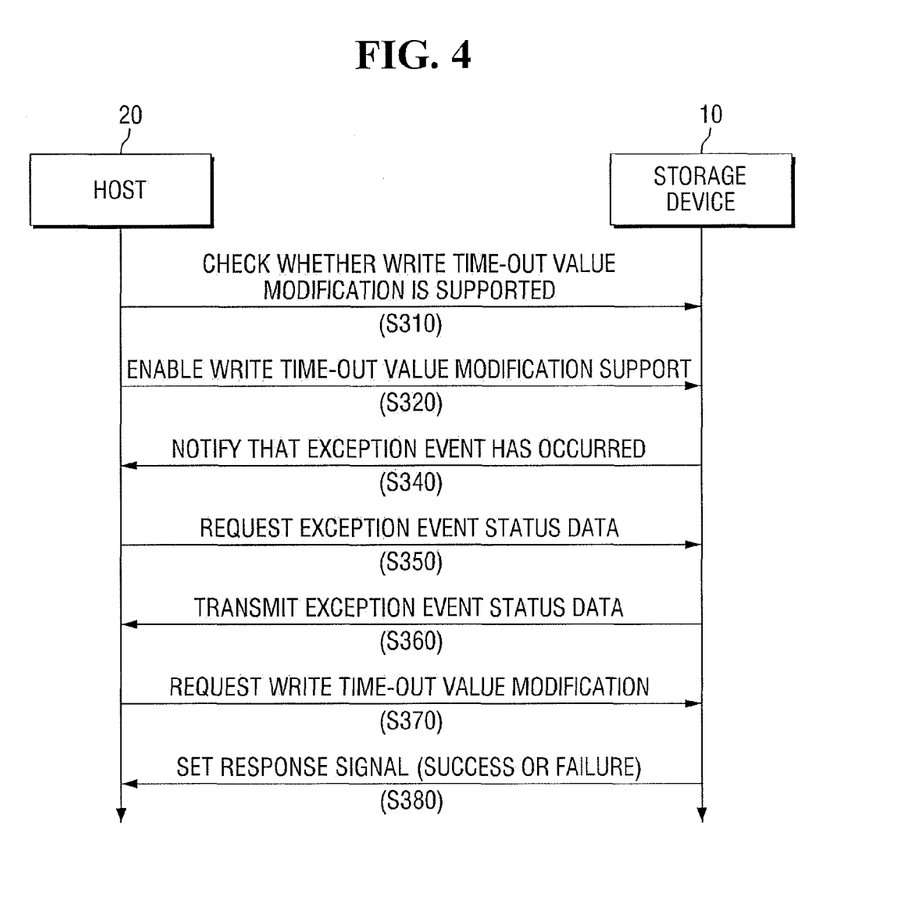
FIG. 4 illustrates a flow chart for explaining an operating method of a storage device system according to an embodiment.
Figure 5:
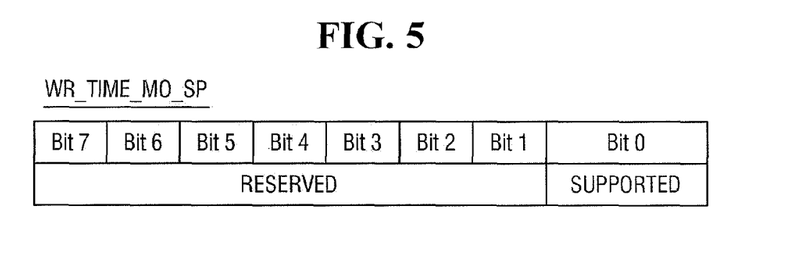
FIG. 5 illustrates an example of write time-out value modification support data.
Figure 6:
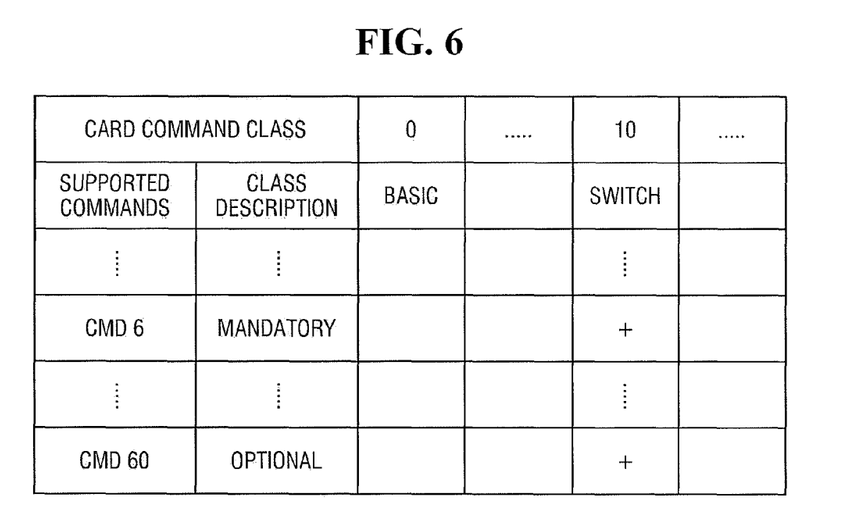
FIG. 6 illustrates an example of a card command class.
Figure 7:
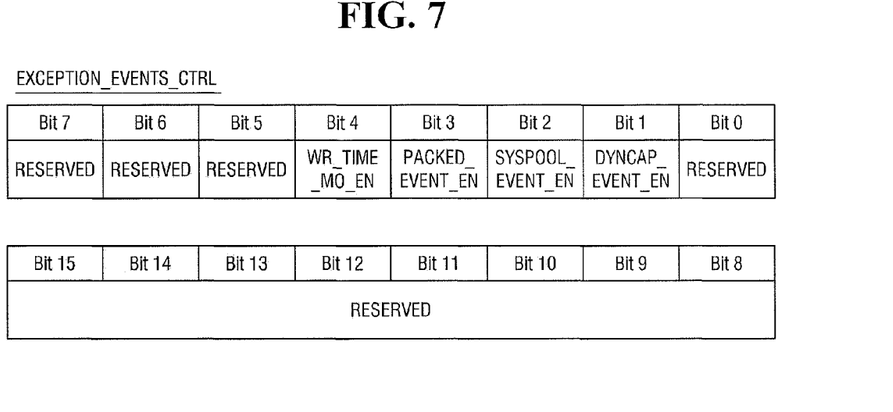
FIG. 7 illustrates an example of exception event control data.
Figure 8:
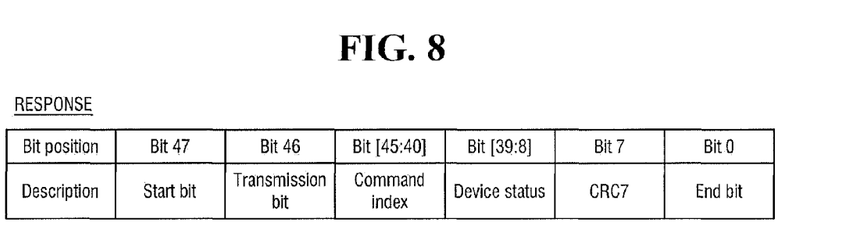
FIG. 8 illustrates an example of a response signal of a storage device.
Figure 9:
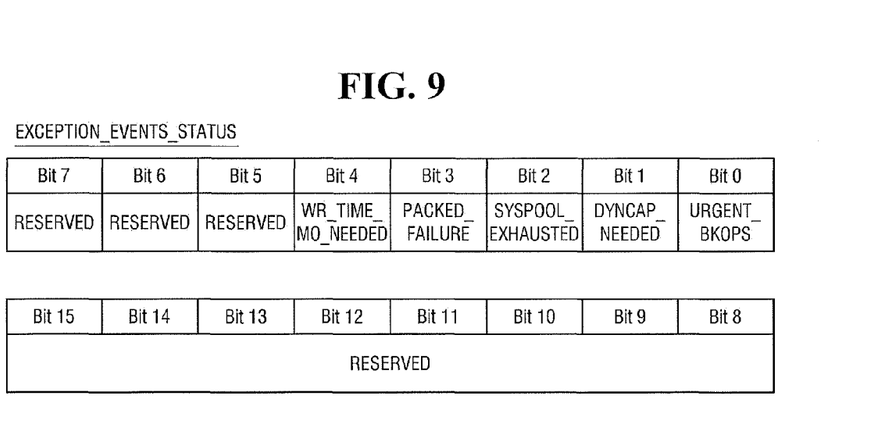
FIG. 9 illustrates an example of exception event status data.
Figure 10:
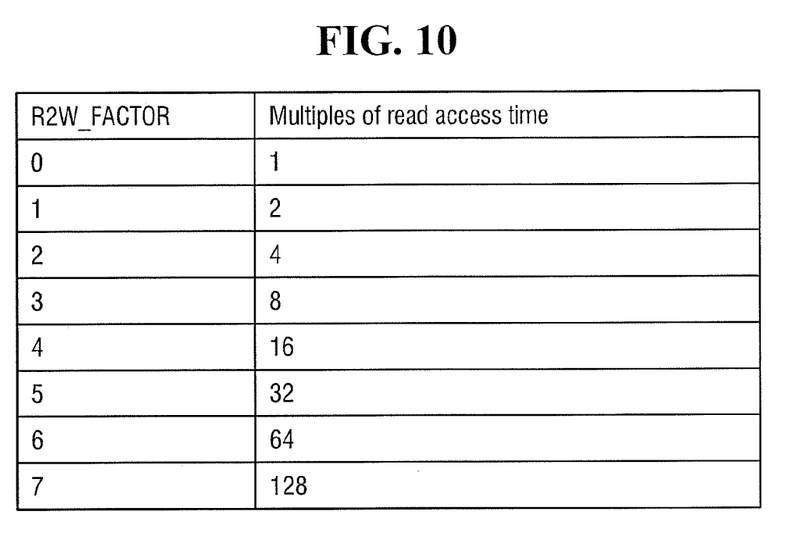
FIG. 10 illustrates R2W_FACTOR.

FIG. 4 illustrates a flow chart for explaining an operating method of a storage device system according to an embodiment. FIG. 5 illustrates an example of write time-out value modification support data. FIG. 6 illustrates an example of a card command class. FIG. 7 illustrates an example of exception event control data. FIG. 8 illustrates an example of a response signal of a storage device. FIG. 9 illustrates an example of exception event status data. FIG. 10 illustrates R2W_FACTOR.

Referring to FIG. 4, the host 20 checks whether the storage device 10 supports the write time-out value modification (S310). That is to say, the interface module 210 transmits a command to the storage device 10 and determines whether the storage device 10 supports the write time-out value modification.

For example, the controller 100 (specifically, the storage unit 130 in the controller 100) may store write time-out value modification support data WR_TIME_MO_SP indicating whether the write time-out value modification is supported or not. The host 20 may check with the write time-out value modification support data WR_TIME_MO_SP.

The write time-out value modification support data WR_TIME_MO_SP may have a structure as shown in FIG. 5. That is to say, the write time-out value modification support data WR_TIME_MO_SP may have a size of one byte. For example, Bit0 may indicate whether the write time-out value modification is supported or not, and Bit1 to Bit7 may be reserved. Bit0 set to 1 may mean that the write time-out value modification is supported. The host 20 (specifically, the interface module 210) makes a request for checking with the write time-out value modification support data WR_TIME_MO_SP.

When the storage device 10 is an eMMC card, the write time-out value modification support data WR_TIME_MO_SP may be stored in, for example, an EXT_CSD region. When the storage device 10 is a UFS card, the write time-out value modification support data WR_TIME_MO_SP may be stored in, for example, an ATTRIBUTE DESCRIPTOR region.

When the storage device 10 is an SD card, whether or not the write time-out value modification is supported may be determined by checking the write time-out value modification support data WR_TIME_MO_SP and searching for a card command class (CCC) shown in FIG. 6. The card command class CCC defines supported commands, class description, and so on. In addition, the card command class CCC indicates to which class each command belongs. In an exemplary embodiment, FIG. 6 illustrates that CMD6 and CMD60 belong to CCC10, but embodiments are not limited thereto. For example, assuming that a write time-out value modification command is CMD60. In the SD card specification, the CMD6 is a command to check with the card command class CCC. Therefore, the host 20 checks with the card command class CCC using the CMD6, thereby identifying the write time-out value modification command, that is, CMD60. Accordingly, the host 20 may identify whether the write time-out value modification is supported or not.

Next, the host 20 enables the write time-out value modification of the storage device 10 (S320). For example, the controller 100 (specifically, the storage unit 130 in the controller 100) may include exception event control data EXCEPTION_EVENTS_CTRL. The exception event control data EXCEPTION_EVENTS_CTRL may indicate whether to enable the write time-out value modification. In addition, the exception event control data EXCEPTION_EVENTS_CTRL may also indicate which of a plurality of all possible exception events to enable.

The exception event control data EXCEPTION_EVENTS_CTRL may have a structure as shown in FIG. 7. As shown therein, the exception event control data EXCEPTION_EVENTS_CTRL may have a size of 2 bytes. The exception event control data EXCEPTION_EVENTS_CTRL may include multiple enable bits Bit1, Bit2, Bit3 and Bit4, and the other bits may be reserved. For example, Bit1 may be DYNCAP_EVENT_EN indicating whether or not to enable a dynamic capacity. Bit2 may be SYSPOOL_EVENT_EN indicating whether to enable a function of notifying whether or not a system resources pool is exhausted. Bit3 may be PACKED_EVENT_EN indicating whether or not to enable a function of notifying of whether a packed command has failed. Bit4 may be WR_TIME_MO_EN indicating whether to enable the write time-out value modification. Bit4 set to 1 may mean that the write time-out value modification is enabled. The host 20 (specifically, the interface module 210) makes a request for setting WR_TIME_MO_EN. That is to say, the host 20 may set Bit4 to 1.

In an exemplary embodiment, FIG. 7 illustrates that exception event control data EXCEPTION_EVENTS_CTRL includes four enable bits, including DYNCAP_EVENT_EN, SYSPOOL_EVENT_EN, PACKED_EVENT_EN, and WR_TIME_MO_EN, but embodiments are not limited thereto. For example, the exception event control data EXCEPTION_EVENTS_CTRL may be used only for WR_TIME_MO_EN. Alternatively, the exception event control data EXCEPTION_EVENTS_CTRL may include only two enable bits (e.g., DYNCAP_EVENT_EN and WR_TIME_MO_EN).

When the storage device 10 is an eMMC card, the exception event control data EXCEPTION_EVENTS_CTRL may be stored in, for example, an EXT_CSD region. When the storage device 10 is a UFS card, bExceptionEventControl, which is substantially the same as EXCEPTION_EVENTS_CTRL, as defined in the UFS specification, may be used. Here, bExceptionEventControl may be stored in, for example, an ATTRIBUTE DESCRIPTOR region. The bExceptionEventControl may include an enable bit indicating whether to enable the write time-out value modification.

Next, the storage device 10 notifies the host 20 of a need to modify the write time-out value WR_TIME. The need to modify the write time-out value WR_TIME may be notified in various manners. For example, occurrence of an exception event may be notified (S340).

When the storage device 10 is used in excess of a predefined life cycle, the controller 100 may notify the host 20 of a need to modify the write time-out value WR_TIME. For example, when the storage device 10 is an eMMC card, the host 20 transmits a command, and the controller 100 (specifically, the host I/F 110) transmits the received command (that is, a response signal RESPONSE in accordance with the previous command) to the host 20.

As shown in FIG. 8, the response signal RESPONSE may include multiple bits (e.g., 48 bits). For example, Bit47 is a start bit, Bit46 is a transmission bit, Bit[45:40] indicates a command index, Bit[39:8] indicates a device status, Bit7 is cyclic redundancy check, e.g., CRC7, bit, and Bit0 is an end bit. Here, the Bit[39:8] indicating a device status may include first information indicating an exception event (e.g., an EXCEPTION_EVENT bit). EXCEPTION_EVENT 0 indicates that none of all possible exception events have occurred and EXCEPTION_EVENT 1 indicates that at least one of all possible exception events has occurred.

When the storage device 10 is a UFS card, Response UPIU that is substantially the same as the response signal RESPONSE, as defined in the UFS specification, may be used. Here, Response UPIU may include a Device Information field, and the Device Information field may contain first information indicating that an exception event has occurred (e.g., an EVENT_ALERT bit). EVENT_ALERT 0 may indicate that none of all possible exception events have occurred, and EVENT_ALERT 1 may indicate that at least one of all possible exception events has occurred.

Next, the host 20 (specifically, the interface module 210) makes a request to the storage device 10 for exception event status data EXCEPTION_EVENTS_STATUS (S350). Next, the storage device 10 supplies the host 20 with the exception event status data EXCEPTION_EVENTS_STATUS (S360).

In detail, since the host 20 is notified that the exception event has occurred, it is necessary to identify which one of a plurality of all possible exception events has occurred. Therefore, the host 20 makes a request to the storage device 10 for the exception event status data EXCEPTION_EVENTS_STATUS. The exception event status data EXCEPTION_EVENTS_STATUS is data indicating which of the plurality of all possible exception events has occurred. Therefore, the host 20 checks with the exception event status data EXCEPTION_EVENTS_STATUS and determines whether write time-out value modification is needed or not. The exception event status data EXCEPTION_EVENTS_STATUS may include second information indicating whether to modify the write time-out value WR_TIME (e.g., a WR_TIME_MO_NEEDED bit).

The exception event status data EXCEPTION_EVENTS_STATUS may be stored in, for example, in the controller 100 (specifically, the storage unit 130 in the controller 100).

When the storage device 10 is an eMMC card, the exception event status data EXCEPTION_EVENTS_, STATUS may have a structure as shown in FIG. 9. That is to say, the exception event status data EXCEPTION_EVENTS_STATUS may have a size of two bytes. The exception event status data EXCEPTION_EVENTS_STATUS may include multiple status bits Bit0, Bit1, Bit2, Bit3, and Bit4, and the other bits may be reserved. Bit0 may be URGENT_BKOPS indicating whether or not an urgent background operation is needed. Bit1 may be DYNCAP_NEEDED indicating whether or not a dynamic capacity is needed. Bit2 may be SYSPOOL_EVENT_EN indicating whether or not to enable a function of notifying of whether a system resources pool is exhausted. Bit3 may be PACKED_FAILURE indicating whether or not a packed command has failed. Bit4 may be WR_TIME_MO_NEEDED indicating whether modification of the write time-out value WR_TIME is needed or not. Bit4 set to 1 indicates that the write time-out value modification is needed and Bit4 set to 0 indicates that the write time-out value modification is not needed.

In an exemplary embodiment, FIG. 9 illustrates that WR_TIME_MO_NEEDED is arranged in Bit4, but embodiments are not limited thereto. For example, WR_TIME_MO NEEDED may be arranged in Bit5 or Bit6.

FIG. 9 illustrates that the exception event status data EXCEPTION_EVENTS_STATUS includes 5 status bits, including URGENT_BKOPS, DYNCAP_NEEDED, SYSPOOL_EXHAUSTED, PACKED_FAILURE, and WR_TIME_MO_NEEDED, but embodiments are not limited thereto. For example, the exception event status data EXCEPTION_EVENTS_STATUS may be used only for WR_TIME_MO_NEEDED. Alternatively, the exception event status data EXCEPTION_EVENTS_STATUS may include only two status bits (e.g., DYNCAP_NEEDED and WR_TIME_MO NEEDED).

When the storage device 10 is an eMMC card, the exception event status data EXCEPTION_EVENTS_STATUS may be stored in, for example, an EXT_CSD region. When the storage device 10 is a UFS card, bExceptionEventStatus, which is substantially the same as EXCEPTION- _EVENTS_STATUS, as defined in the UFS specification, may be used. Here, bExceptionEventStatus may be stored in, for example, an ATTRIBUTE DESCRIPTOR region. The bExceptionEventStatus may include a status bit indicating whether the write time-out value modification is needed or not.

Next, the host 20 makes a request to the storage device 10 for modification of the write time-out value WR_TIME (S370). The write time-out value WR_TIME may be modified in various manners.

For example, the controller 100 may directly increase, e.g., double, the initially defined write time-out value WR_TIME. For example, the controller 100 may directly increase the value from 250 msec to 500 msec.

Alternatively, the controller 100 may modify the write time-out value WR_TIME by correcting R2W_FACTOR. The R2W_FACTOR is a value that indicates how many multiples a write time-out value WR_TIME is of a read access time. As shown in FIG. 10, the R2W_FACTOR may be, for example, 0, 1, 2, 3, 4, 5, 6, or 7. As can be seen in FIG. 10, the actual multiple of the write time-out value WR_TIME is 2 to the R2W factor. When the R2W FACTOR is 0, the write time-out value WR_TIME is equal to the read access time. When the R2W_FACTOR is 1, the write time-out value WR_TIME may be twice of the read access time. The controller 100 may increase the write time-out value WR_TIME by increasing the R2W_FACTOR. For example, R2W_FACTOR correction may be used when the storage device 10 is an eMMC card or an SD card, but embodiments are not limited thereto.

Alternatively, the controller 100 may modify the write time-out value WR_TIME by correcting a busy timeout period. The busy timeout period means a maximum busy time for correcting data written in the storage device 10. For example, busy timeout period correction may be used in a case where the storage device 10 is a UFS card.

Next, the storage device 10 notifies the host 20 of a modification result of the write time-out value WR_TIME (that is, success/failure) (S380). That is to say, the storage device 10 transmits a set response signal to the host 20. In accordance with the request from the host 20, the storage device 10 modifies the write time-out value WR_TIME.

Figure 11:
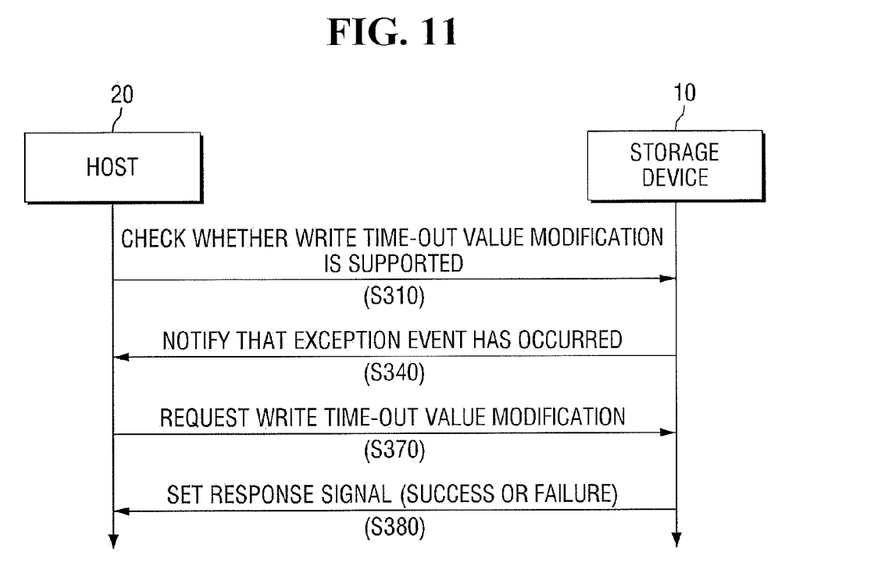
FIG. 11 illustrates a flow chart for explaining an operating method of a storage device system according to another embodiment.

FIG. 11 illustrates a flow chart for explaining an operating method of a storage device system according to another embodiment. In the following description, contents substantially the same as described above in FIG. 4 will not be repeated.

Referring to FIG. 11, the host 20 checks whether the storage device 10 supports modification of the write time-out value WR_TIME (S310). Next, the storage device 10 notifies the host of a need for modification of the write time-out value WR_TIME. For example, the storage device 10 may notify the host 20 of occurrence of an exception event (S340). Then, the host 20 makes a request to the storage device 10 for modification of the write time-out value WR_TIME. (S370). Next, the storage device 10 notifies the host 20 of a modification result of the write time-out value WR_TIME (that is, success/failure) (S380). That is to say, the storage device 10 transmits the set response signal to the host 20.

Here, enabling the modification of the write time-out value WR_TIME (S320 of FIG. 4) may be omitted. That is to say, when the modification of the write time-out value WR_TIME is supported, the modification of the write time-out value WR_TIME may be enabled by a default value.

In addition, making the request for the exception event status data EXCEPTION_EVENTS_STATUS (S350 of FIG. 4) may also be omitted. In other words, when the exception event occurs is recognized as a need for modification of the write time-out value WR_TIME, it is not necessary for the host 20 to check with the exception event status data EXCEPTION_EVENTS_STATUS.

Figure 12:
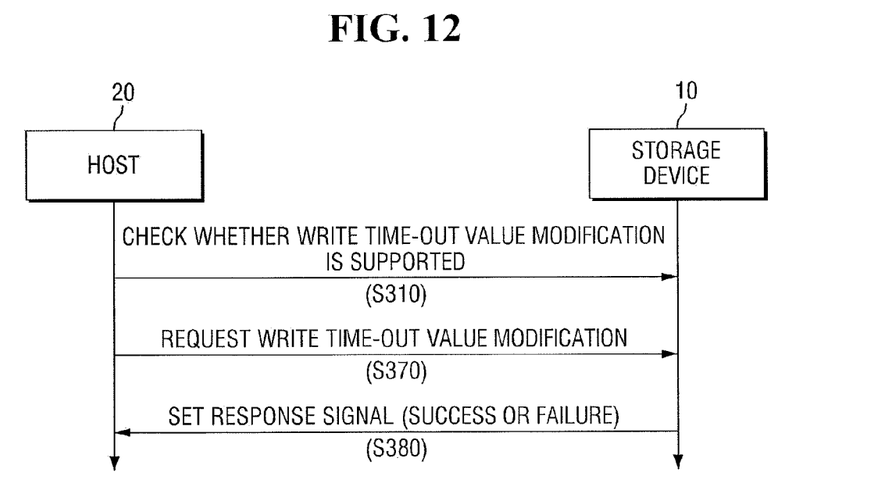
FIG. 12 illustrates a flow chart for explaining an operating method of a storage device system according to still another embodiment.

FIG. 12 illustrates a flow chart for explaining an operating method of a storage device system according to still another embodiment. In the following description, contents substantially the same as described above in FIG. 4 will not be repeated.

Referring to FIG. 12, the host 20 checks whether the storage device 10 supports modification of the write time-out value WR_TIME (S310). The host 20 makes a request to the storage device 10 for modification of the write time-out value WR_TIME. (S370). Next, the storage device 10 notifies the host 20 of a modification result of the write time-out value WR_TIME (that is, success/failure) (S380). That is to say, the storage device 10 transmits the set response signal to the host 20.

Here, even if the storage device 10 does not notify the host 20 of occurrence of an exception event EXCEPTION_EVENT, the host 20 may make a request to the storage device 10 for modification of the write time-out value WR_TIME. That is to say, S340 and S350 may be omitted. For example, when write operations are continuously treated as failures or errors more than or equal to a predetermined number of times, the host 20 may make a request for modification of the write time-out value WR_TIME.

Figure 13:
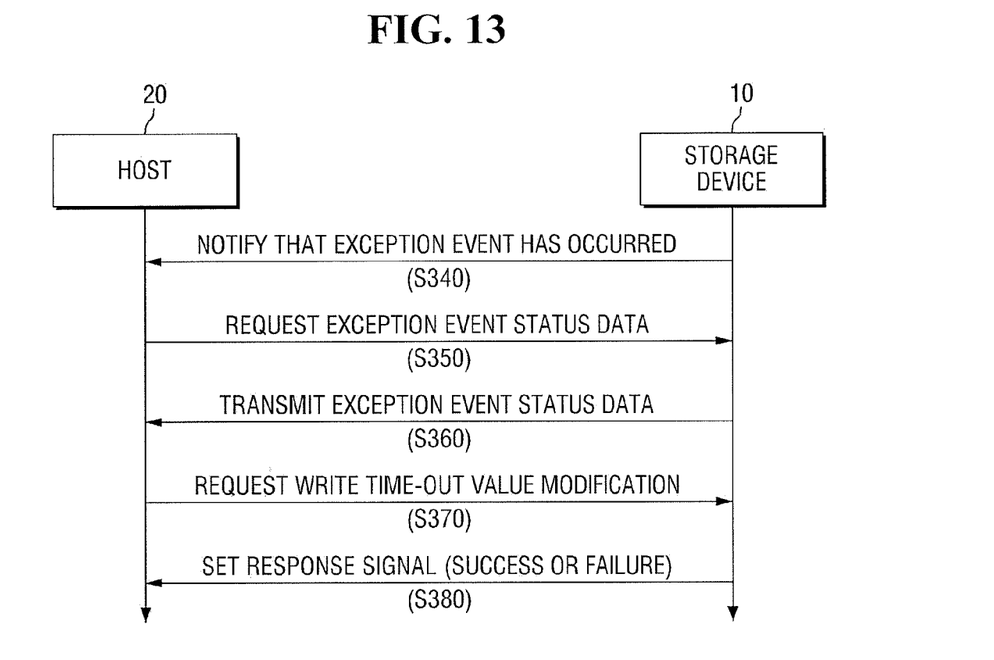
FIG. 13 illustrates a flow chart for explaining an operating method of a storage device system according to still another embodiment.

FIG. 13 illustrates a flow chart for explaining an operating method of a storage device system according to still another embodiment. In the following description, contents substantially the same as described above in FIG. 4 will not be described.

Referring to FIG. 13, the storage device 10 notifies the host 20 of a need for modification of the write time-out value WR_TIME. For example, the storage device 10 may notify the host 20 that the write time-out value WR_TIME needs to be modified. For example, the storage device 10 may notify the host 20 that an exception event has occurred (S340). The host 20 makes a request to the storage device 10 for the exception event status data EXCEPTION_EVENTS_STATUS (S350). Next, the storage device 10 supplies the host 20 with the exception event status data EXCEPTION_EVENTS_STATUS (S360). The host 20 makes a request to the storage device 10 for modification of the write time-out value WR_TIME (S370). The storage device 10 notifies the host 20 of a modification result of the write time-out value WR_TIME (that is, success/failure) (S380). That is to say, the storage device 10 transmits the set response signal to the host 20.

Here, the host 20 checking whether the storage device 10 supports the modification of the write time-out value WR_TIME (S310 of FIG. 4) may be omitted. That is to say, the ability to modify the write time-out value WR_TIME may be set as a default.

Embodiments provide a storage device having an increase in life cycle, a host device, which can increase a life cycle of a storage device, an operating method of a storage device, which can increase a life cycle of the storage device, and operating methods of a storage device and a host device, which can increase a life cycle of the storage device.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A storage device, comprising:
a nonvolatile memory device that stores data; and
a controller that controls the nonvolatile memory device, wherein
the controller transmits exception event status data to a host, receives a request from the host for write time-out value modification and modifies a write time-out value of the nonvolatile memory device, wherein:
the exception event status data includes information associated with at least two different kinds of exception events, and
one of the at least two different kinds of exception events is associated with the write time-out value modification.

2. The storage device as claimed in claim 1, wherein, when the storage device is used in excess of a predefined life cycle, the controller increases the write time-out value to extend a life cycle of the storage device.

3. The storage device as claimed in claim 1, wherein, before a request for the write time-out value modification is received from the host, the controller notifies the host of a need for the write time-out value modification.

4. The storage device as claimed in claim 3, wherein notifying the need for the write time-out value modification comprises the controller transmitting a response signal to the host in accordance with a previous command, the response signal including first information indicating occurrence of an exception event.

5. The storage device as claimed in claim 1, wherein, before a request for the write time-out value modification is received from the host, the controller transmits to the host the exception event status data indicating what kind of exception event has occurred to the storage device.

6. The storage device as claimed in claim 5, wherein the exception event status data includes second information indicating whether or not to modify the write time-out value.

7. The storage device as claimed in claim 1, wherein the controller stores write time-out value modification support data indicating whether or not write time-out value modification is supported.

8. The storage device as claimed in claim 1, wherein the controller stores exception event control data indicating whether or not to enable the write time-out value modification.

9. The storage device as claimed in claim 1, wherein the controller uses a R2W factor to modify the write time-out value.

10. The storage device as claimed in claim 1, wherein the controller modifies the write time-out value by correcting a busy timeout period.

11. The storage device as claimed in claim 1, wherein
the controller transmits exception event status data to the host in response to a request of the host for the exception event status data.

12. A storage device, comprising:
a nonvolatile memory device that stores data; and
a controller that controls the nonvolatile memory device, wherein, when the nonvolatile memory device is used in excess of a predefined life cycle, the controller increases a write time-out value of the nonvolatile memory device to extend a life cycle of the storage device.

13. The storage device as claimed in claim 12, wherein the controller notifies a host of a need for write time-out value modification, receives a request for the write time-out value modification from the host, and modifies the write time-out value of the nonvolatile memory device.

14. The storage device as claimed in claim 13, wherein the controller transmits a response signal to the host in accordance with a previous command, the response signal including first information indicating occurrence of an exception event.

15. A storage device, comprising:
a host interface that transmits exception event status data to a host and receives a request for write time-out value modification from the host; and
a processor that modifies the write time-out value of the storage device in accordance with the request for the write time-out value modification, wherein:
the exception event status data includes information associated with at least two different kinds of exception events, and
one of the at least two different kinds of exception events is associated with the write time-out value modification.

16. The storage device as claimed in claim 15, wherein, before the request for the write time-out value modification is received from the host, the host interface notifies the host of a need for the write time-out value modification.

17. The storage device as claimed in claim 16, wherein the host interface transmits a response signal to the host in accordance with a previous command, the response signal including first information indicating occurrence of an exception event.

18. The storage device as claimed in claim 15, further comprising a storage unit that stores event status data indicating what kind of exception event has occurred to the storage device, wherein the exception event status data includes second information indicating whether or not to modify the write time-out value, wherein, before the request for the write time-out value modification is received from the host, the host interface receives a request for the exception event status data.

19. The storage device as claimed in claim 15, further comprising a storage unit that stores write time-out value modification support data indicating whether or not the write time-out value modification is supported.

20. The storage device as claimed in claim 15, further comprising a storage unit that stores exception event control data indicating whether or not to enable the write time-out value modification.

21. A host device that controls a storage device including a nonvolatile memory device, the host device comprising:
a host processor that receives exception event status data from the storage device and determines whether to modify a write time-out value of the nonvolatile memory device or not based on the exception event status data; and
an interface module connecting the host processor and the storage device, the interface module that makes a request for the write time-out value modification to the storage device according to the determination result, wherein:
the exception event status data includes information associated with at least two different kinds of exception events, and
one of the at least two different kinds of exception events is associated with the write time-out value modification.

22. The host device as claimed in claim 21, wherein the interface module makes a request for the exception event status data indicating what kind of exception event has occurred to the storage device.

23. The host device as claimed in claim 21, wherein the interface module makes a request to the storage device to check write time-out value modification support data indicating whether or not a write time-out value function is supported.

24. The host device as claimed in claim 21, wherein the interface module makes a request to the storage device for setting exception event control data indicating whether or not to enable the write time-out value modification.

25. An operating method of a storage device, comprising:
transmitting exception event status data to a host;
receiving a request for write time-out value modification from the host;
modifying the write time-out value of the storage device in accordance with the request for the write time-out value modification; and
providing a set response signal indicating that the write time-out value is modified, wherein
modifying the write time-out value occurs only after predefined life cycle of the storage device.

26. The operating method as claimed in claim 25, before requesting the write time-out value modification is received from the host, further comprising notifying the host of a need for the write time-out value modification.

27. A storage device, comprising:
a nonvolatile memory device that stores data; and
a controller that controls the nonvolatile memory device,
wherein the controller transmits exception event status data to a host, modifies a write time-out value of the nonvolatile memory device, and sends a notification to the host that modification of the write time-out value of the nonvolatile memory device has occurred, wherein
the modification of the write time-out value occurs only after predefined life cycle of the storage device.

28. The storage device as claimed in claim 27, wherein the controller modifies the write time-out value of the nonvolatile memory device by increasing an initially defined write time-out value of the nonvolatile memory device.

29. The storage device as claimed in claim 27, wherein the controller modifies the write time-out value of the nonvolatile memory device by multiplying a read access time by a factor.

30. The storage device as claimed in claim 27, wherein the controller modifies the write time-out value of the nonvolatile memory device by correcting a busy timeout period.

31. The storage device as claimed in claim 27, wherein the controller transmits to the host the exception event status data indicating what kind of exception event has occurred to the storage device.

\* \* \* \* \*